United States Patent
Chen et al.

(10) Patent No.: US 7,516,628 B2
(45) Date of Patent: Apr. 14, 2009

(54) ON-LINE THICKNESS GAUGE AND METHOD FOR MEASURING THE THICKNESS OF A MOVING GLASS SUBSTRATE

(75) Inventors: Kenneth C. Chen, Danville, KY (US); Edward J. Lenhardt, Elmira, NY (US); Daniel Y. K. Ma, Horseheads, NY (US); Jeffrey C. McCreary, Horseheads, NY (US); James P. Terrell, Jr., Ithaca, NY (US)

(73) Assignee: Corning Incorporated, Corning, NY (US)

( * ) Notice: Subject to any disclaimer, the term of this patent is extended or adjusted under 35 U.S.C. 154(b) by 310 days.

(21) Appl. No.: 11/034,172

(22) Filed: Jan. 11, 2005

(65) Prior Publication Data

US 2006/0150678 A1   Jul. 13, 2006

(51) Int. Cl.
   *C03B 18/02*   (2006.01)
(52) U.S. Cl. .................. 65/29.14; 65/162; 65/203; 65/158; 65/160; 65/176; 250/559.27; 250/559.07; 250/559.19
(58) Field of Classification Search .................. 65/29.14
   See application file for complete search history.

(56) References Cited

U.S. PATENT DOCUMENTS

| | | | |
|---|---|---|---|
| 1,548,445 A | 11/1922 | Corl | |
| 1,983,755 A * | 12/1934 | Heichert | 414/609 |
| 2,911,760 A * | 11/1959 | Barradell-Smith | 65/158 |
| 3,338,696 A | 8/1967 | Dockerty | 65/145 |
| 3,523,776 A * | 8/1970 | McMaster | 65/25.3 |
| 3,591,293 A | 7/1971 | Maltby, Jr. | |
| 3,682,609 A | 8/1972 | Dockewrty | 65/83 |
| 4,902,902 A | 2/1990 | Tole | |
| 5,966,214 A * | 10/1999 | Imbrock et al. | 356/632 |
| 6,590,221 B2 * | 7/2003 | Ha et al. | 250/559.27 |

OTHER PUBLICATIONS

Jari Rasanen and Kai-Erik Peiponen, Online measurement of thickness and optical quality of float glass with a sensor based on a diffractive element, Oct. 1, 2001, Applied Optics, vol. 40, No. 28, pp. 5034-5039.*
PCT International Search Report for International Application No. PCT/US06/00988 dated Sep. 5, 2007.
US 6,590,211, 07/2003, Joseph et al. (withdrawn)

* cited by examiner

*Primary Examiner*—Philip C Tucker
*Assistant Examiner*—Phu H Nguyen
(74) *Attorney, Agent, or Firm*—Thomas R. Beall; William J. Tucker (57) ABSTRACT

An on-line thickness gauge (OLTG) and method are described herein that are capable of measuring a thickness of a moving glass substrate. In the preferred embodiment, the OLTG includes a Y-guide and a stabilizing unit that respectively captures and stabilizes the moving glass substrate. The OLTG also includes a laser instrument which contains a laser source and a detector. The laser source emits a beam at the front surface of the moving glass substrate. And, the detector receives two beams one of which was reflected by the front surface of the moving glass substrate and the other beam which was reflected by the back surface of the moving glass substrate. The OLTG further includes a processor that analyzes the two beams received by the detector to determine a distance between the two beams which is then used to determine the thickness of the moving glass substrate.

14 Claims, 7 Drawing Sheets

ON-LINE THICKNESS GAUGE AND METHOD FOR MEASURING THE THICKNESS OF A MOVING GLASS SUBSTRATE

BACKGROUND OF THE INVENTION

1. Field of the Invention

The present invention relates to an on-line thickness gauge (OLTG) and method capable of measuring the thickness of a moving glass substrate (glass sheet).

2. Description of Related Art

Manufacturers of glass substrates (e.g., LCD glass substrates) which can be used in devices like flat panel displays are constantly trying to improve their glass manufacturing process/system so they can make glass substrates that are more uniformly thick. To make uniformly thick glass substrates, it would be very helpful if the manufacturers could accurately determine the thickness of a glass substrate as it was being manufactured. If this can be done, then the manufacturers could use this thickness information to adjust and better control the glass manufacturing process/system in real time so they can make uniformly thick glass substrates. An on-line thickness gauge (OLTG) and method that are capable of measuring the thickness of a glass substrate while it is being manufactured is the subject of the present invention.

BRIEF DESCRIPTION OF THE INVENTION

The present invention includes an OLTG and method that are capable of measuring a thickness of a moving glass substrate. In the preferred embodiment, the OLTG includes a Y-guide and a stabilizing unit that respectively captures and stabilizes the moving glass substrate. The OLTG also includes a laser instrument which contains a laser source and a detector. The laser source emits a beam at the front surface of the moving glass substrate. And, the detector receives two beams one of which was reflected by the front surface of the moving glass substrate and the other beam which was reflected by the back surface of the moving glass substrate. The OLTG further includes a processor that analyzes the two beams received by the detector to determine a distance between the two beams which is then used to determine the thickness of the moving glass substrate.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1-12, there are disclosed an OLTG 102 and method 1200 which are capable of measuring the thickness of a moving glass substrate 155 (glass sheet 155) in accordance with the present invention. Prior to describing the OLTG 102 and method 1200, a brief discussion is provided about an exemplary glass manufacturing system 100 which uses a fusion process to make glass substrates 155 and which can also incorporate and use the OLTG 102 and method 1200. Although the glass manufacturing system 100 described herein uses the fusion process to make glass substrates 155, it should be understood that the OLTG 102 and method 1200 could be incorporated into and used by any type of glass manufacturing system. Accordingly, the OLTG 102 and method 1200 of the present invention should not be construed in such a limited manner.

Figure 1:
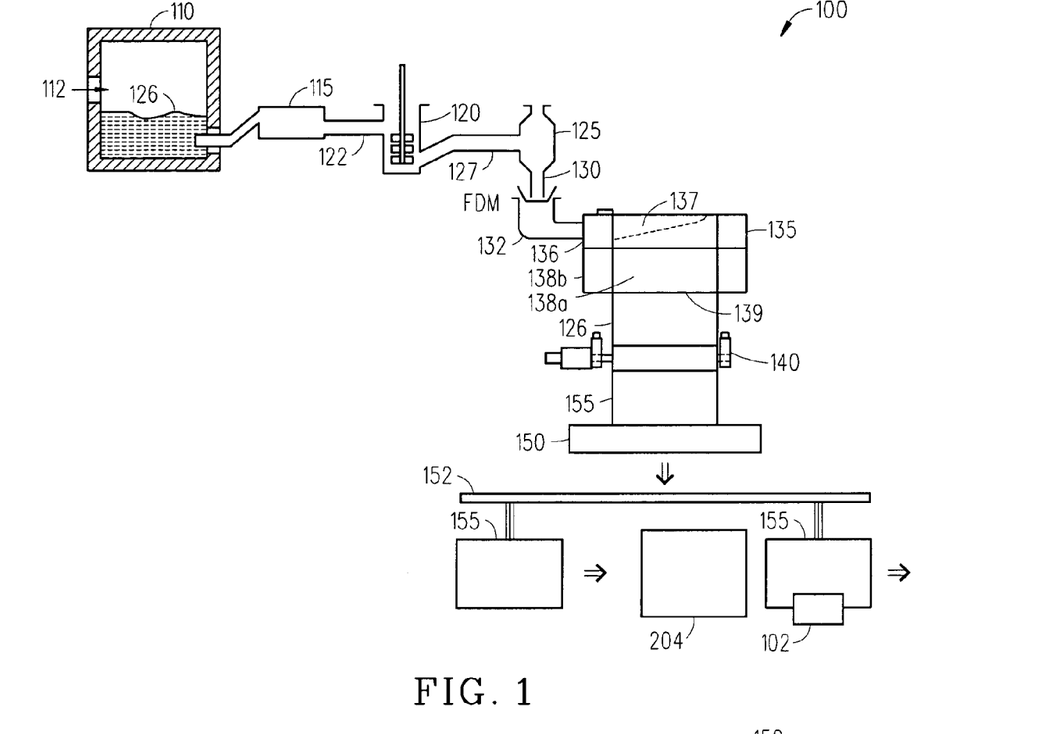
FIG. 1 is a block diagram illustrating an exemplary glass manufacturing system which can incorporate an OLTG in accordance with the present invention.

Referring to FIG. 1, there is shown a schematic view of the exemplary glass manufacturing system 100 that uses the fusion process to make glass substrates 155. The glass manufacturing system 100 includes a melting vessel 110, a fining vessel 115, a mixing vessel 120 (e.g., stir chamber 120), a delivery vessel 125 (e.g., bowl 125), a forming vessel 135 (e.g., isopipe 135), a pull roll assembly 140, a scoring device 150, a conveyor system 152 and the OLTG 102.

The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127. The delivery vessel 125 delivers the molten glass 126 through a downcomer 130 to an inlet 132 and into the forming vessel 135 (e.g., isopipe 135). The forming vessel 135 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140 to form the glass substrate 155. The scoring device 150 then cuts the drawn glass substrate 155 into distinct pieces of glass substrates 155 which are carried by a conveyor system 152 to and through the OLTG 102. At this point, the desirable glass substrates 155 are then packed and shipped to a customer.

Figure 2A:
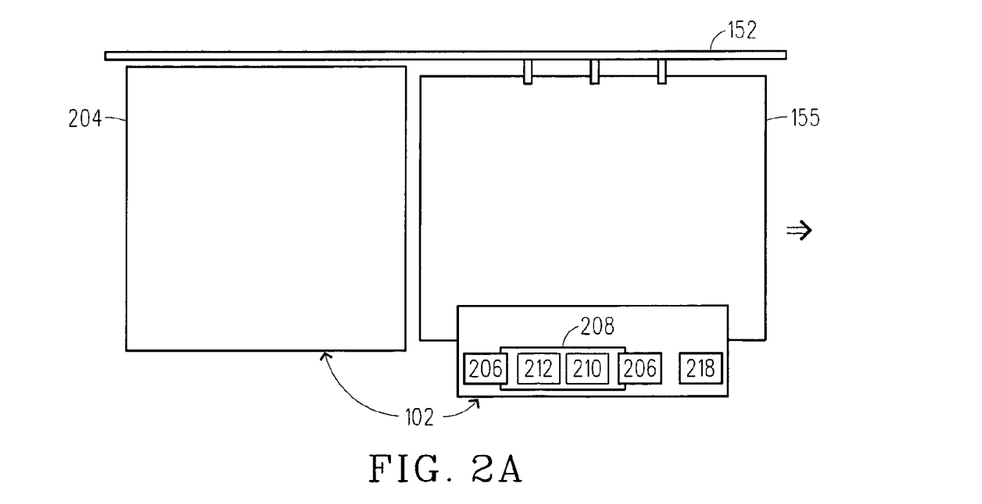
FIGS. 2A-2C are three diagrams that respectively illustrate a front view, a left side view and a top view of the OLTG in accordance with the present invention.
Figure 2B:
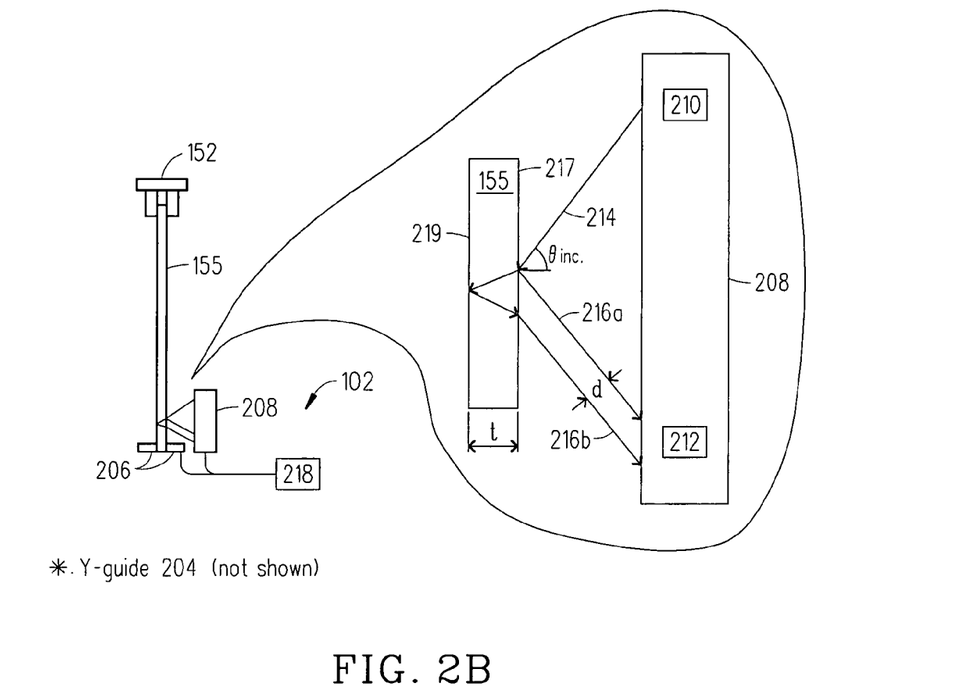
Figure 2C:
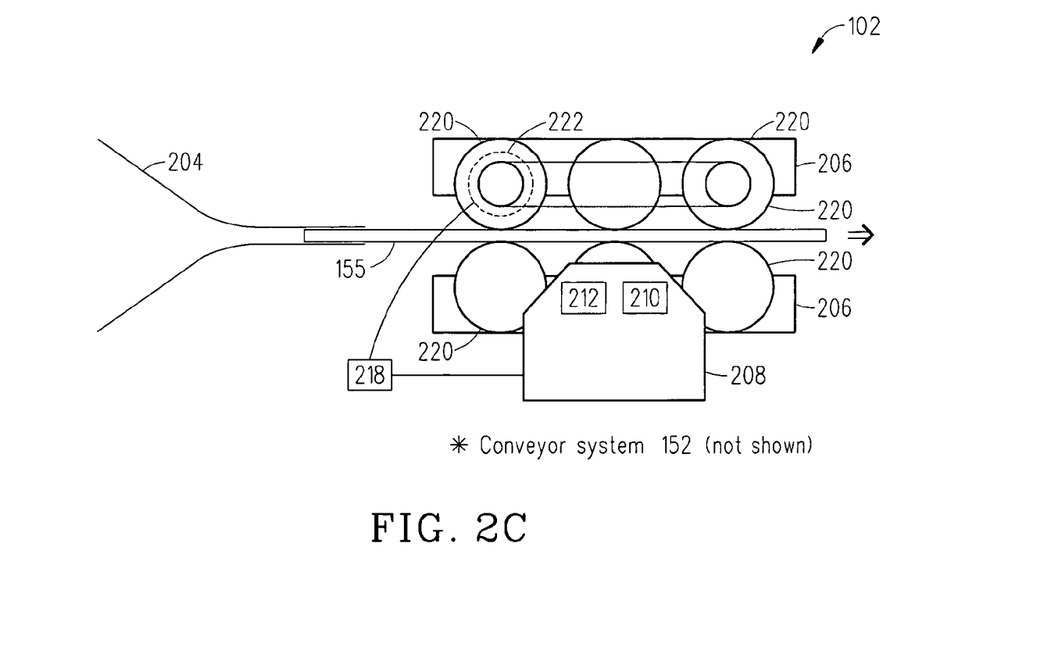

Referring to FIGS. 2A-2C, there are three diagrams that respectively illustrate a front view, a left side view and a top view of the OLTG 102 in accordance with the present invention. As shown, the OLTG 102 includes a Y-guide 204 and a stabilizing unit 206 which respectively function to capture and stabilize the glass sheet 155 while it is being moved by the conveyor system 152 (see FIG. 2C). The OLTG 102 also includes a laser instrument 208 that contains a laser source 210 and a detector 212. The laser source 210 emits a beam 214 at the front surface 217 of the moving glass substrate 155. And, the detector 212 receives a first beam 216a that is reflected by the front surface 217 of the moving glass substrate 155. In addition, the detector 212 receives a second beam 216b that is reflected by a back surface 219 of the moving glass sheet 155 (see FIG. 2B). The OLTG 102 further includes a processor 218 (computer 218) that analyzes the two beams 216a and 216b to determine a distance "d"

between the two beams 216a and 216b. Then, the processor 218 uses the measured distance "d" to determine the thickness "t" of the moving glass substrate 155 (see FIG. 2B). In the preferred embodiment, the processor 218 determines the thickness "t" of the moving glass substrate 155 by using the following equation:

$$t = d/[2 \cos \theta_{incidence} \tan [\sin^{-1}((n_{air}/n_{glass}) \sin \theta_{incidence})]]$$

where:

t=thickness of the moving glass substrate 155;

d=distance between the beams 216a and 216b received by the detector 212;

$n_{air}$=refraction index of air;

$n_{glass}$=refraction index of the glass substrate 155; and $\theta_{incidence}$=angle of incidence that the beam 214 interfaces with the front surface 217 of the moving glass substrate 155.

It should be appreciated that the processor 218 may be a separate unit from the laser instrument 208 (as shown). Or, the processor 218 may be part of the laser instrument 208 (not shown). Or, in yet another alternative, the present invention may use an external computer (not shown) in addition to the processor 218 which may or may not be part of the laser instrument 208.

In the preferred embodiment, the laser instrument 208 is a laser triangulation sensor 208. The laser sensor 208 needs to have the glass substrate 155 positioned perpendicular to it and also needs to have the glass substrate 155 located approximately 28 mm+/−2 mm away from it in order to be able to obtain an accurate measurement. To ensure that the glass substrate 155 is properly positioned with respect to the laser sensor 208, the Y-guide 204 is used to guide the glass sheet 155 to a series of contacting wheels 220 that are part of the stabilizing unit 206. The stabilizing unit 206 removes a horizontal bow in the glass substrate 155 so the laser sensor 208 can be placed as close as possible to the wheels 220 which in turn minimizes the effect of the vertical bow in the glass substrate 155. This is one way, the laser sensor 208 can be properly positioned with respect to the moving glass substrate 155 so it can obtain an accurate measurement.

In this embodiment, the stabilizing unit 206 incorporates an encoder 222 which is used to measure a position on the glass substrate 155 while the laser sensor 208 is making thickness readings. The encoder 222 is attached to one of the belt-driven wheels 220 of the stabilizing unit 206. The processor 218 by knowing a diameter of the attached wheel 220 and knowing a count from the encoder 222 can then convert that count into a distance reading in mm (for example). In this way, the processor 218 can determine the thickness "t" of the glass substrate 155 at a known position across the width of the glass substrate 155. Hence, the processor 218 can generate a profile of the glass substrate 155 that contains an array of data pairs each of which includes a thickness measurement and the corresponding location on the glass substrate 155 where the thickness was measured (see FIG. 3).

Figure 3:
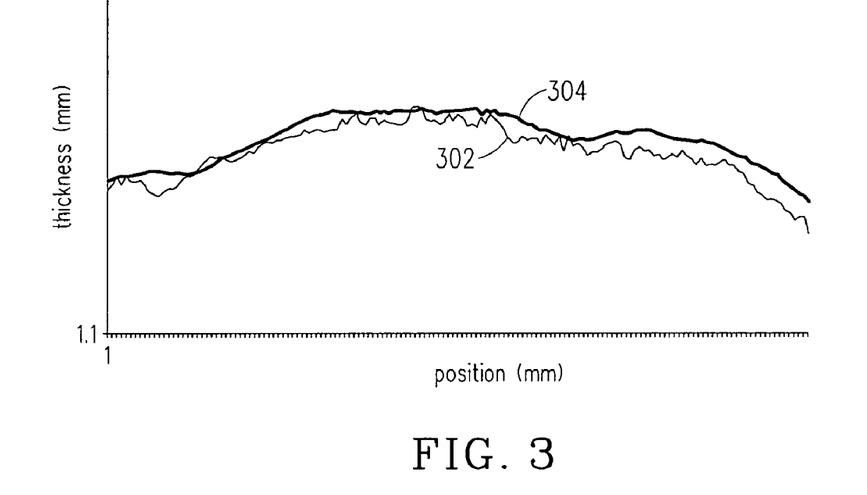
FIG. 3 is a graph that shows thickness data that was obtained from the OLTG and thickness data that was obtained from a traditional off-line thickness measurement gauge.

Referring to FIG. 3, there is a graph that shows thickness data 302 that was obtained from the OLTG 102 and thickness data 304 that was obtained from an off-line thickness measurement system. The offline system requires a sample to be removed from the production line where the thickness is measured in a destructive manner. Since the offline gauge is a destructive test, more aggressive methods can be applied to control the location of the glass sheets; additionally, the measurement can be made at slow speeds to enhance the accuracy of the thickness data and encoder position. A detailed description about the preferred embodiment and alternative embodiments of the OLTG 102 is provided below with respect to FIGS. 4-11.

1. Description of OLTG 102 (Online Thickness Gauge 102)

1.1 Purpose and Function

A main purpose of the OLTG 102 is to measure the thickness profile of the glass substrate 155 before it is packed and shipped to a customer. Another purpose of the OLTG 102 is to measure the thickness of the glass substrate 155 as it travels on the production conveyor 152. The OLTG 102 initiates and performs the measurement cycle automatically once it senses the presence of the glass substrate 155. In this way, the glass substrate 155 is measured without any manual handling. This is important since as the size of the glass substrate 155 increases, manually handling and carrying a glass substrate 155 becomes more difficult.

The measurement data obtained from the OLTG 102 is the glass thickness "t" at a specific position across the width of the glass substrate 155. Thus, a glass profile can be generated which is an array of data pairs with each data pair specified by f (width position, glass thickness). An advantage of the present invention is that the speed of the FDM 140 can be automatically controlled by using the real thickness feedback from the OLTG 102 (see FIG. 1). This would enable one to better control glass thickness and also reduce other process variations.

1.2 Theory of Operation

The OLTG 102 obtains the glass profile by measuring the glass thickness "t" as the glass substrate 155 passes in front of the laser sensor 208. And, the laser sensor 208 enables the glass thickness "t" to be determined by using reflection and refraction from a laser beam 214 (see FIG. 2B).

1.2.1 Setup/Operational Criteria

The glass substrate 155 travels on a conveyor system 152 that grasps the top of the glass while the rest of the glass hangs from grips (see FIG. 2A). The glass substrate 155 does not hang perfectly vertical, due to process and other environmental issues.

1.2.2 Measurement Sequence

Figure 4:
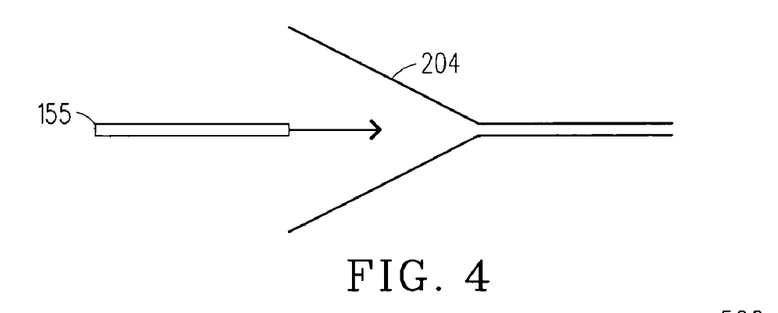
FIGS. 4-11 are diagrams that illustrate in greater detail the different components of the OLTG in accordance with the present invention.
Figure 11:
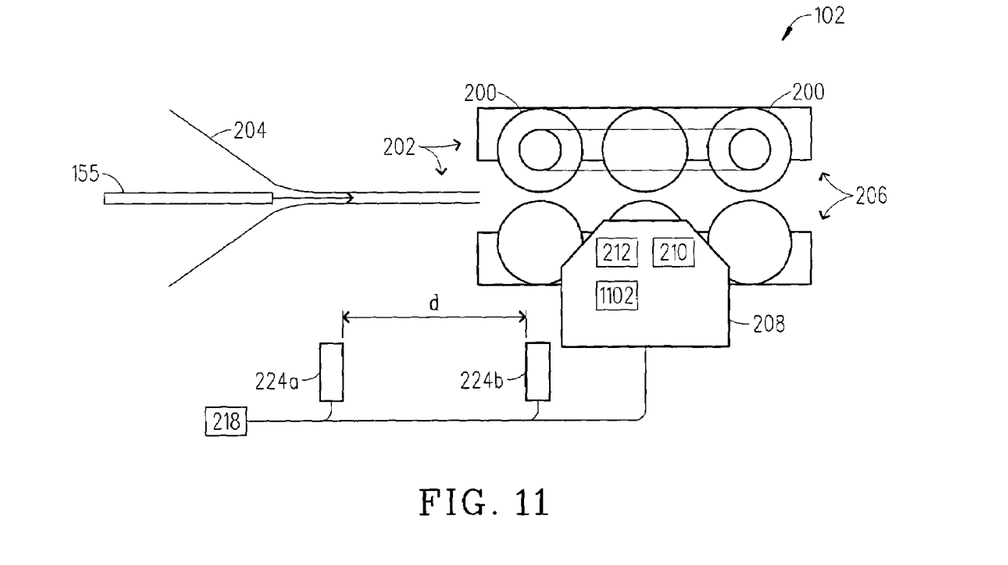

As the glass substrate 155 travels into the OLTG 102, the glass substrate 155 is captured and stabilized by a "Glass Capture 204" (e.g., see Y-guide 204 in FIG. 4). Once in the "Glass Capture 204", the glass substrate 155 passes two proximity sensors 224a and 224b (e.g., lasers 224a and 224b) that are shown in FIG. 11. A purpose of the sensors 224a and 224b is to enable the determination of the velocity and the width of the moving glass substrate 155. The sensors 224a and 224b can be used instead of the encoder 222 (see FIG. 2C).

Next, the glass substrate 155 passes in front of the laser sensor 208 which makes the thickness measurement readings. Each thickness measurement from the laser sensor 208 is time-stamped and recorded for post-measurement processing by the processor 218 (or some other computer).

After, the sensors 224a and 224b confirm that the glass substrate 155 has passed the laser sensor 208 and no thickness measurements are needed. Then, the processor 208 uses the recorded data to compute a glass thickness profile of the glass substrate 155.

As an option, a reference glass substrate 155 (not shown) can then be automatically pushed into place by a piston (not shown) to verify that the laser sensor 208 is not drifting and is measuring correctly.

1.3 Equipment

1.3.1 Hardware Components

For a prototype of the OLTG 102, the equipment hardware included:
- Laser Triangulation Sensor 208.
- Counter/Timer Card.
- Input/Output Card.
- Encoder Card.
- Motion Drive/Controller.
- Linear Motion Slide
- Industrial Computer 218.
- RS-485 Interface Card

1.3.2 Software Components

The prototype computer 218 used Windows 2000 as the operating system and custom software. For development, Visual Basic 6.0 was also installed.

2.0 Design

The following section describes in greater detail each aspect of the OLTG 102.

2.1 Constraints

To handle the glass substrate 155, there is a non-quality area at the bottom of the glass substrate 155 that can be used by the OLTG 102. This non-quality area is typically 20 mm and at the bottom of the glass substrate 155.

During production, the glass substrate 155 typically travels on the conveyor 152 at a speed in which the glass substrate 155 tends to sway side to side. In addition, the glass substrate 155 has a natural bow, from processing, that can cause it to not hang vertically downward. All of this is addressed by the OLTG 102.

There are specifications on the laser sensor 208 that need to be satisfied in order to obtain accurate thickness measurements. For example, the measurement window of the preferred laser triangulation sensor 208 is 28 mm±2 mm. And, the tilt of the glass substrate 155 should not be more than 1°.

2.2 Capturing of Glass

In order to "capture" the glass substrate 155, there are two basic methods described herein: the static method and the dynamic method.

The static method is shown in FIG. 4 (see also FIG. 2C). In one embodiment, the Y-guide 204 includes a pair of metal guides that can channel the glass substrate 155 into place. The metal guides should be relatively long and thick so they do not spring back into the glass substrate 155.

Figure 5:
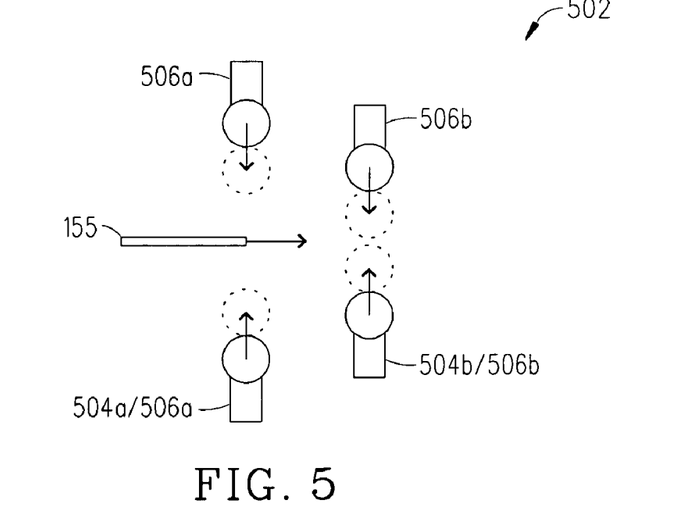

The dynamic method is shown in FIG. 5. In one embodiment, the guide 502 utilizes sensors 504a and 504b and two pairs of pneumatic cylinders 506a and 506b to push the glass substrate 155 into place. In operation, the glass substrate 155 would trigger the first sensor 504a which causes the first pair of cylinders 506a to close and push in partially on the glass substrate 155. Then, the glass substrate 155 would trigger the second sensor 504b which causes the second pair of cylinders 506b to close and secure the glass substrate 155 even more before the glass substrate 155 is sent to the "Glass Stabilizer 206" (not shown here but see FIGS. 2C and 11).

2.3 Stability of Glass

Figure 6A:
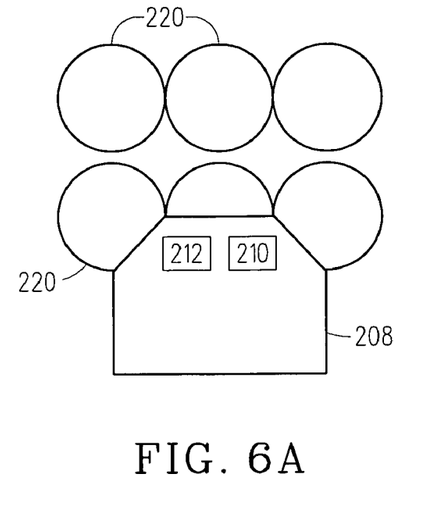
Figure 6B:
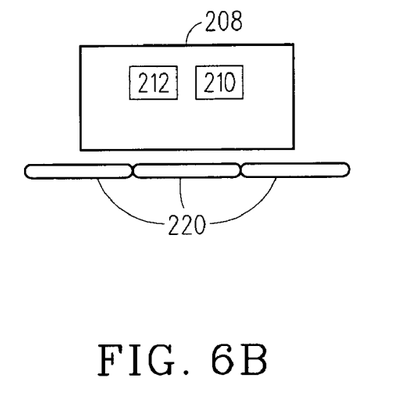
Figure 7A:
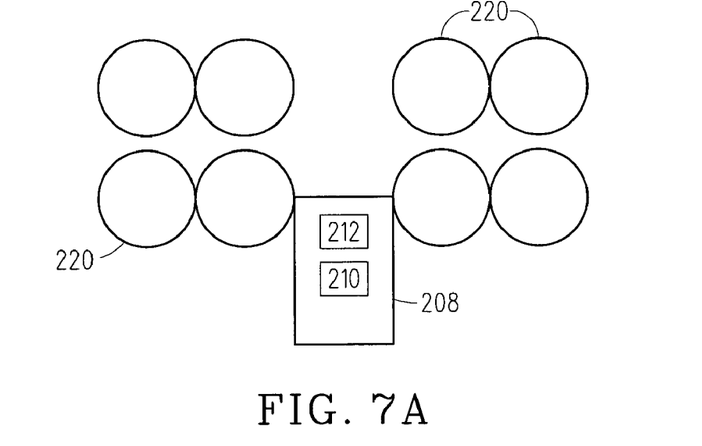
Figure 7B:
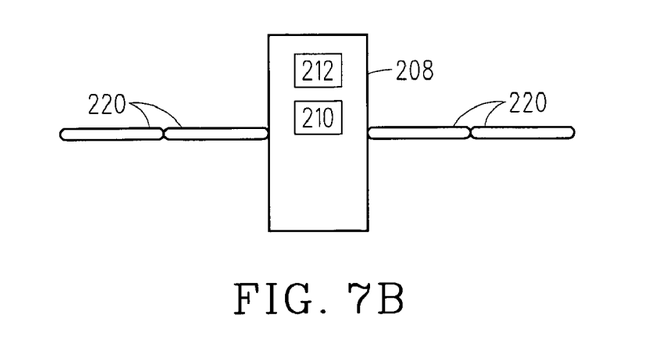

To ensure the glass substrate 155 is correctly located in front of the laser sensor 208 as described in Section 2.1, a "Glass Stabilizer 206" can be used as shown in FIGS. 6 and 7 (see also FIG. 2C). Typically, the longer the stabilizer 206 and the more wheels 220 it has, the better.

2.4 Laser Sensor Placement

Because of the natural bowing of the glass substrate 155, the glass substrate 155 may bow out of the acceptable field of view of the laser triangulation sensor 208 and/or introduce a tilt beyond the specification limit. To help address this problem, the laser sensor 208 should be located as close as possible to the wheels 220 of the "Glass Stabilizer 206". This way, the wheels 220 serve as a point of reference and it can be assumed that the glass substrate 155 will not shift too far away from this position.

Referring again to FIG. 3, it can be seen that the thickness measurement 302 from the OLTG 102 has more noise than the thickness measurement 304 made by the traditional offline thickness gauge. The main factor that causes this is that the traditional offline thickness gauge (which can be set to run at slower speeds) is set to perform internal averaging of approximately 5-10 points. While, the OLTG 102 is not set to perform any averaging because of the high rate of speed of the glass involved.

Depending on the manufacturing process, the noise can be minimized by mounting the laser sensor 208 either horizontally or vertically. In FIG. 6A (top view) and FIG. 6B (side view), the laser sensor 208 is shown mounted horizontally which enables the wheels 220 to be spaced closer which in turn stabilizes the glass substrate 155 at more points. In the preferred embodiment, the horizontally mounted laser sensor 208 would be located approximately 23 mm above the wheels 220.

The other option is to vertically mount the laser sensor 208 as shown in FIG. 7A (top view) and FIG. 7B (side view). Although the vertically mounted laser sensor 208 can be closer to the wheels 220 on the horizontal plane, the wheels 220 are spaced farther apart when compared to the horizontally mounted laser sensor 208.

2.5 Measurement of Glass Velocity and Length

2.5.1 Encoder Method

Figure 8:
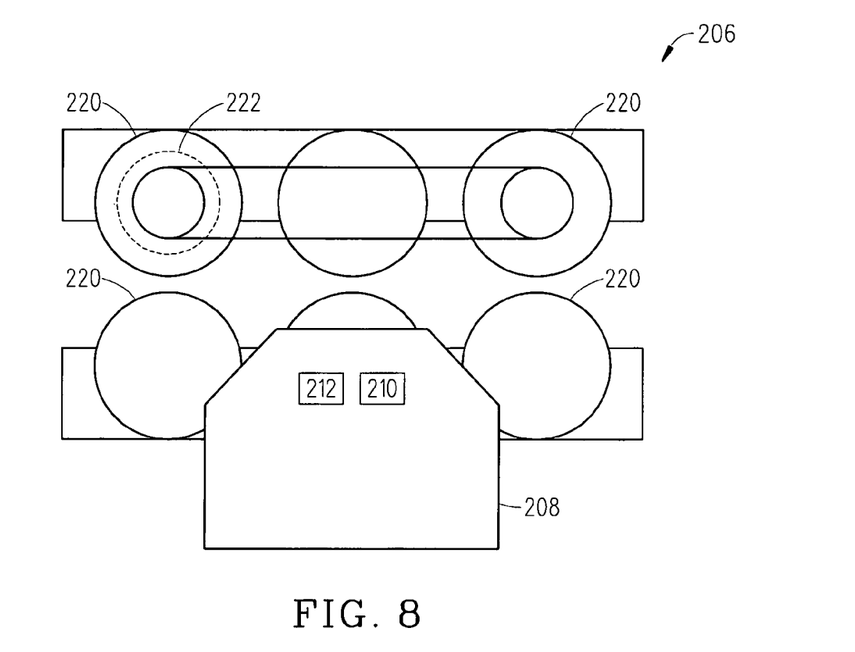

This method is shown in FIGS. 2C and 8 where an encoder wheel 222 which runs along the glass substrate 155 is used to obtain the positions of thickness measurements that are made along the width of the glass substrate 155. As can be seen, the encoder wheel 222 can be attached to one of the wheels 220 of the "Glass Stabilizer 206".

Figure 9:
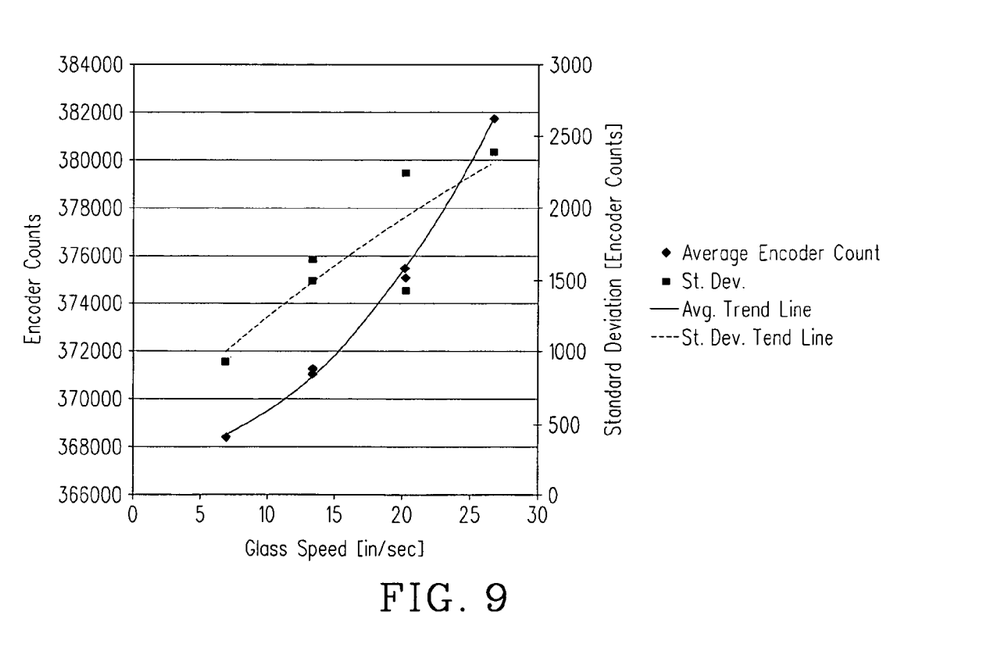
Figure 10:
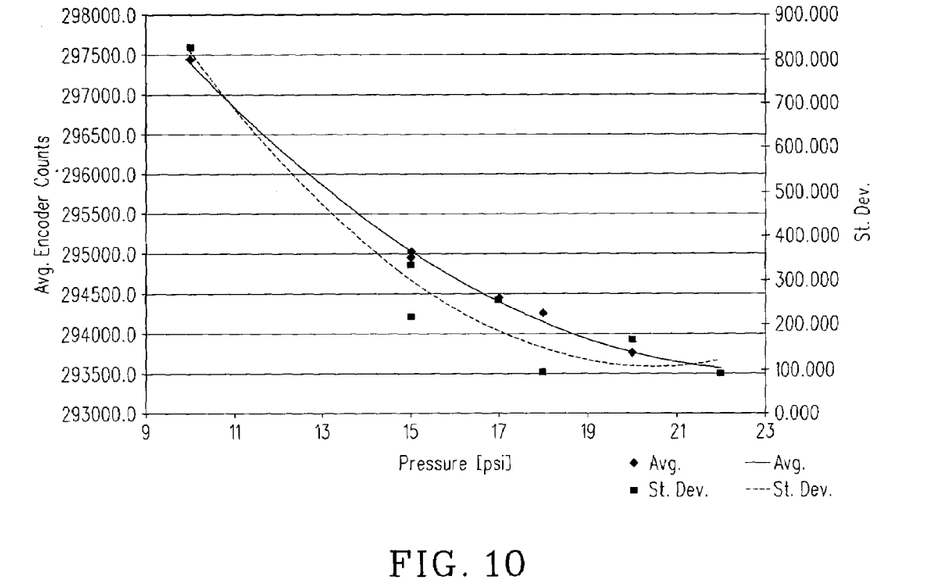

There are two main factors that can affect the reliability of the position measurements when using the encoder method: (1) the speed that the glass substrate 155 enters the OLTG 102; and (2) the pressure applied to the glass substrate 155 from the "Glass Stabilizer 206" The speed of the glass substrate 155 affects the total encoder count. FIG. 9 is a graph which shows the results from an experiment performed to show that total count from the encoder 222 was a function of the speed of the glass substrate 155. It is believed that there are three possible points of error which can cause this variability: (1) when the glass substrate 155 enters the stabilizer 206 and bounces; (2) slippage along the glass substrate 155; and (3) momentum of the wheels 220 after glass substrate 155 exits the stabilizer 206. It is unclear how much each condition contributes to the variability, but the difference of 12000 encoder counts is significant (approximately 50 mm, depending on the conversion number).

The other problem is that the pressure of the wheels 220 which are applied to the glass substrate 155 can change the count from the encoder 222. This can be seen in the graph shown in FIG. 10 where the differences in the pressure can deform O-rings on the wheels 220 which in turn changes the overall diameter of the wheel 220 and the resulting encoder count.

2.5.2 Proximity Sensors Method

Another method for determining the positions of thickness measurements that are made along the width of the glass sheet 155 utilizes two proximity sensors 224a and 224b and an accurate timer 1102 that are shown in FIG. 11. The sensors 224a and 224b are placed apart in a manner so they can each sense the leading edge of the glass substrate 155. The timer 1102 is used to determine when the glass substrate 155 passes in front of the sensors 224a and 224b.

The velocity of the glass is determined by knowing the time, t, it takes for the glass substrate 155 to traverse the known distance, d. To obtain the length of the glass substrate 155, one sensor 224a or 224b is also used to sense the trailing edge of the glass substrate 155. The length is then calculated by multiplying the velocity and the time it takes the glass substrate 155 to pass that sensor 224a or 224b.

One criterion for this method to work properly is that the speed of the glass substrate 155 needs to be relatively constant. And, there are three practical considerations that should also be taken into account: (1) repeatability of the sensors 224a and 224b detecting the leading edge of the glass substrate 155; (2) speed consistency of the conveyor 152; and (3) system hardware response time.

To get an idea of the level of precision needed for this method to work, an exemplary uncertainty calculation is provided next. Excluding adjustment numbers (ie. beam width, system latency, etc.), the length equation is essentially:

$$L = t_{2lt}V \text{ and } V = \frac{d_{12}}{t_2 - t_1} = \frac{d_{12}}{\Delta t_{21}}$$

For simplicity, the current parameters are approximately:

$d_{12}$: Distance between the first and second sensor 224a and 224b (135 mm)

$\Delta t_{21}$: Time for leading edge of glass substrate 155 to go from first proximity sensor 224a to second proximity sensor 224b (0.243 sec)

$T_{2lt}$: Time for glass substrate to pass in front of second proximity sensor 224b, from leading edge to trailing edge (2.7 sec)

Using these numbers as nominal, it yields a glass length of 1500 mm:

$$L = t_{2lt}V = (2.7)\frac{135 \text{ mm}}{0.243 \text{ s}} = 1500 \text{ mm}$$

2.5.3 Conveyor Speed Consistency

To increase the level of accuracy, material handling of the glass substrate 155 by the conveyor 152 should be examined closely. As noted before, in order for the OLTG 102 to work properly, one prerequisite is that each glass substrate 155 needs to move through the OLTG 102 at a relatively constant speed. Even though the speed can vary from glass substrate 155 to glass substrate 155.

3.0 Measurement Loop 3.1 Timing

The following describes an exemplary measurement loop when the OLTG 102 is in measurement mode.

The measurement loop begins with devoting 100% CPU time in the processor 218 to the monitoring of the first velocity sensor 224a to detect the leading edge of the glass substrate 155. This is done by assigning the highest priority to the program's thread. This is needed because, as described above, minute timing becomes significant. The processor 218 may also monitor the second sensor 224b in the event that a glass substrate 155 with a shorter height than expected is being passed through.

Once the first velocity sensor 224a detects the leading edge of the incoming glass substrate 155, the time is recorded via a hardware timer/counter card in the processor 218. Then, 100% of the CPU in the processor 218 is spent monitoring the second velocity sensor 224b to detect the leading edge of the glass substrate 155. Again, the time is recorded when the second sensor 224b senses the leading edge of the glass substrate 155.

Next, the laser sensor 208 readings are recorded so the glass thickness measurements can be made. When the laser sensor 208 is on, the laser sensor 208 continually sends out thickness measurement data via RS-485 at 19.2 kbps (for example) to the processor 218. After the second velocity sensor 224b is triggered by the leading edge of the glass substrate 155, the processor 218 records all data from the laser sensor 208. It should be noted that not all of the recorded data is going to be valid. This is because of a lag in time for the glass substrate 155 to travel from the second sensor 224b to the front of the laser sensor 208.

As the thickness measurement data is being captured by the processor 218, another sensor (not shown) can check to see if the glass substrate 155 has passed the OLTG 102. This is done by monitoring for the trailing edge of the glass substrate 155. Once this sensor (not shown) detects the trailing edge of the glass substrate 155, the processor 218 stops recording the data sent from the laser sensor 208 and goes into post processing of the data. And, the program's thread is put into normal priority to give the operating system an opportunity to perform any "housekeeping" tasks (i.e. network monitoring, file updates, etc.).

When all the data is processed and data written onto the drive, the processor 218 can perform a reference routine (optional). In this routine, the processor 218 first double-checks to make sure there is no glass substrate 155 passing through the OLTG 102 by monitoring all the proximity sensors 224a and 224b. Then, a piston (not shown) places a reference glass substrate 155 in place for the laser sensor 208 to read. The laser sensor 208 takes a reading and records the data into a calibration file. The piston then pulls the reference glass substrate 155 out of the way so the OLTG 102 is ready for the next glass substrate 155 to pass through for measurement. During the reference reading routine, the first sensor 224a is constantly monitored to see if a glass substrate 144 is unexpectedly coming to the OLTG 102.

Before the processor 218 loops back to the start of the measurement cycle, approximately 10 seconds can be added to the loop to enable an operator to move the mouse, stop the program, etc. before the program goes into high thread priority. This 10 second value assumes that the next glass substrate 155 will not arrive until ~14 seconds later.

One way to handle the timing of when the program should go into high priority and yet enable operator interaction is to have a proximity sensor (not shown) before the first velocity sensor 224a. The proximity sensor (not shown) can be monitored to detect the glass substrate 155 while the program is still in normal priority. Once that sensor detects the glass substrate 155 then the program goes into high priority and monitors the first velocity sensor 224a. This way, the program goes into high priority at the appropriate time.

3.2 Outlying Data

There is a potential that the laser sensor 208 can report an erroneous measurement (i.e. extremely thick, thin, or zero thickness), especially if there is no internal averaging. To address this, the data can be filtered to eliminate the data outliers. For instance, the OLTG 102 can filter outliers by comparing the current thickness reading with the previous thickness reading.

3.3 Noise Filtering

Because, the OLTG 102 measures the thickness of a moving glass substrate 155, the thickness profile tends to be noisier than compared to the traditional offline thickness gauge (see FIG. 3). One possible technique that can be used to smooth this thickness data is to apply a low-pass filter.

Figure 12:
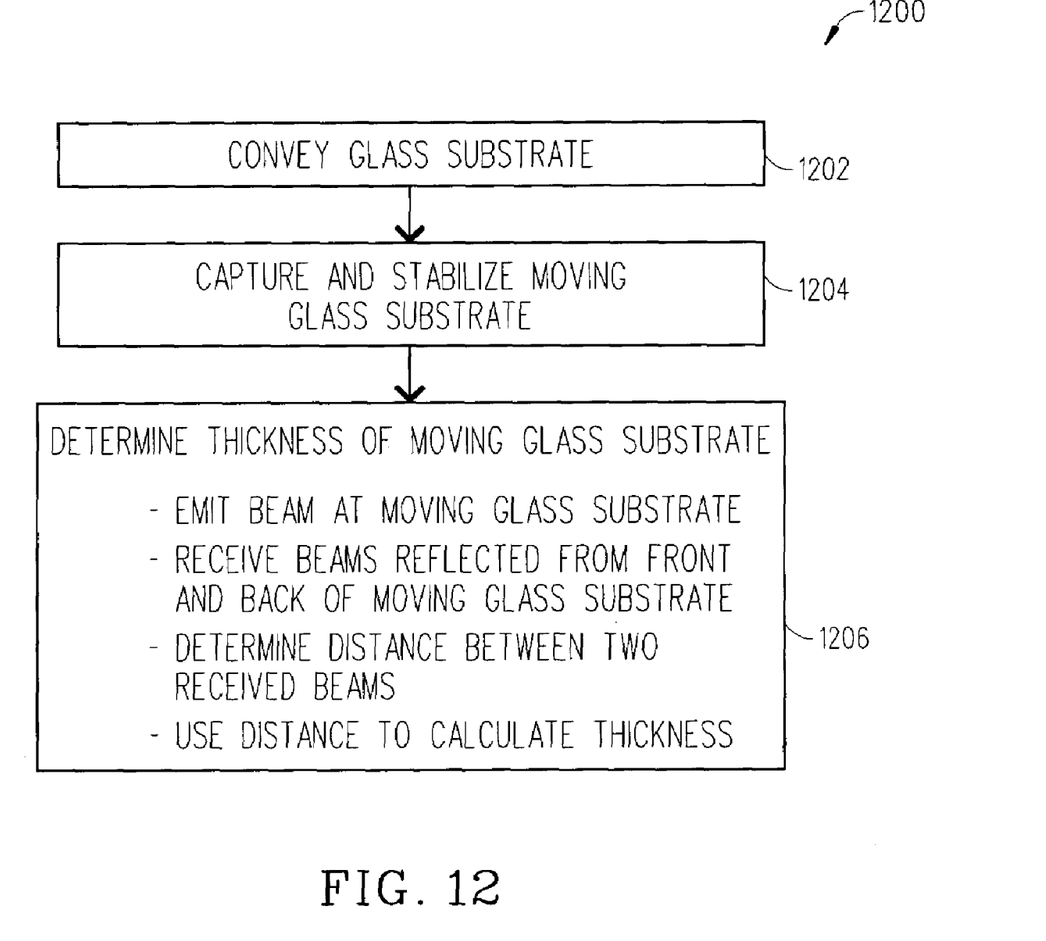
FIG. 12 is a flowchart illustrating the basic steps of a preferred method for measuring the thickness of a moving glass substrate in accordance with the present invention.

Referring now to FIG. 12, there is shown a flowchart illustrating the basic steps of a preferred method 1200 for measuring the thickness "t" of a moving glass substrate 155 in accordance with the present invention. Beginning at step 1202, the glass manufacturing system 100 is used to make the glass substrate 155 which is then moved by the conveyor 152 to the OLGT 102. At step 1204, the OLGT 102 and in particular the Y-guide 204 (or dynamic guide 502) and the stabilizing unit 206 captures and stabilizes the moving glass substrate 155. At step 1206, the OLGT 102 and in particular the laser sensor 208 and processor 218 determines the thickness "t" of the moving glass substrate 155. To accomplish this, the laser sensor 208 emits a beam 214 at the moving glass substrate 155 and then receives two beams 216a and 216b respectively reflected by the front and back surfaces 217 and 219 of the moving glass substrate 155. Then, the processor 218 analyzes the received beams 216a and 216b and determines a distance "d" between the beams 216a and 216b which in turn is used to determine the thickness "t" of the moving glass substrate 155 (see FIG. 2B). The processor 218 can determine the thickness of the moving glass substrate 155 by using the following equation:

$$t = d/[2 \cos \theta_{incidence} \tan [\sin^{-1}((n_{air}/n_{glass})\sin \theta_{incidence})]]$$

where:
t=thickness of the moving glass substrate 155;
d=distance between the beams 216a and 216b received by the detector 212;
$n_{air}$=refraction index of air;
$n_{glass}$=refraction index of the glass substrate 155; and
$\theta_{incidence}$=angle of incidence that the beam 214 interfaces with the front surface 217 of the moving glass substrate 155.

Following are some additional features and advantages of using the OLTG 102 and method 1200 of the present invention:

The OLTG 102 provides the following advantages that traditional offline thickness gauges do not have:
  Provide Forming process feedback in a real time so adjustment can be made to control glass thickness and reduce other process variation.
  No sample loss.
  Requires no additional glass handling to get measurement data.
  100% measurement not a sampling.

It should be appreciated that the glass manufacturing system 100 is exemplary and that other types and configurations of glass manufacturing systems can incorporate and use the OLTG 102 and method 1200 of the present invention.

The OLTG 102 can be mounted on a sliding base so it can be moved in and out of the path of the moving glass substrates 155. In addition, the OLTG 102 and in particular the laser sensor 208 can be mounted so it can be automatically moved up and down to take into account different glass heights.

It should be noted that there is a U.S. Pat. No. 6,590,211 entitled "On-line Measurement System for Measuring Substrate Thickness and the Method Thereof". In this patent, an image detector was used to measure glass thickness at its focus plane, which is different from the technology used in the present invention.

The glass sheets 402 can be made in accordance with a fusion process which is one technique for producing sheets of glass used in liquid crystal displays (LCDs). The fusion process is described in U.S. Pat. Nos. 3,338, 696 and 3,682,609, the contents of which are incorporated herein by reference.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. An on-line thickness gauge (OLTG) for measuring a thickness of a moving pre-cut glass substrate, said system comprising:
   a conveyor that grasps a top of the pre-cut glass substrate and moves the pre-cut glass substrate;
   a glass capture device through which the moving pre-cut glass substrate travels where the glass capture device captures both a front surface and a back surface of the moving pre-cut glass substrate, where the conveyor still grasping the top of the pre-cut glass substrate moves the pre-cut glass substrate through the glass capture device; wherein said glass capture device includes: a Y-guide that includes a pair of guides that capture and channel the moving pre-cut glass substrate into place to be received by a stabilizing device;
   said stabilizing device through which the previously captured moving pre-cut glass substrate travels where the stabilizing device stabilizes both the front surface and the back surface of a bottom of the previously captured moving pre-cut glass substrate, where the conveyor still grasping the top of the pre-cut glass substrate moves the pre-cut glass substrate through the glass capture device; wherein said stabilizing device includes a plurality of belt-driven rollers that drives both the front surface and the back surface of the previously captured pre-cut glass substrate;
   a laser source that emits a single beam at a front surface of the stabilized moving pre-cut glass substrate;
   a detector that receives a first beam reflected by the front surface of the stabilized moving pre-cut glass substrate and receives a second beam reflected by a back surface of the stabilized moving pre-cut glass substrate; and
   a processor that analyzes the first beam and the second beam received by said detector to determine a distance between the first beam and the second beam where the distance is used to determine the thickness of the stabilized moving pre-cut glass substrate.

2. The OLTG of claim 1, wherein the measured thickness of the stabilized moving pre-cut glass substrate can be used as feedback to control the thickness of subsequent pre-cut glass substrates that are manufactured.

3. The OLTG of claim 1, wherein said processor determines the thickness of the stabilized moving pre-cut glass substrate by using the following equation:

$$t = d/[2\cos\theta_{incidence} \tan[\sin^{-1}((n_{air}/n_{glass})\sin\theta_{incidence})]]$$

where:
- t=thickness of the stabilized moving pre-cut glass substrate;
- d=distance between the first beam and the second beam received by said detector;
- $n_{air}$=refraction index of air;
- $n_{glass}$=refraction index of the pre-cut glass substrate; and
- $\theta_{incidence}$=angle of incidence that the emitted single beam interfaces with the front surface of the stabilized moving pre-cut glass substrate.

4. The OLTG of claim 1, wherein said processor uses signals received from an encoder to determine positions on the stabilized moving pre-cut glass substrate which correspond with where thickness measurements were made, where the encoder is attached to one of the rollers in the plurality of belt-driven rollers.

5. The OLTG of claim 1, further comprising a pair of proximity sensors that send signals to said processor which uses said signals to determine positions on the stabilized moving pre-cut glass substrate which correspond with where thickness measurements were made.

6. The OLTG of claim 1, further comprising a pair of proximity sensors that send signals to said processor which uses said signals to determine a velocity and a width of the moving pre-cut glass substrate.

7. A glass manufacturing system comprising:
- at least one vessel for melting batch materials and forming molten glass;
- a forming apparatus for receiving the molten glass and forming a glass sheet;
- a pulling machine for drawing the glass sheet;
- a cutting machine for cutting the drawn glass sheet;
- a conveyor for moving the cut glass sheet; and
- an on-line thickness gauge (OLTG) for measuring a thickness of the moving cut glass sheet, said system including:
  - a glass capture device through which the moving cut glass sheet travels where the glass capture device captures both a front surface and a back surface of the moving cut glass sheet, where the conveyor grasps a top of the cut glass substrate and moves the cut glass substrate through the glass capture device; wherein said glass capture device includes: a Y-guide that includes a pair of guides that capture and channel the moving cut glass sheet into place to be received by a stabilizing device;
  - said stabilizing device through which the previously captured moving cut glass sheet travels where the stabilizing device stabilizes both the front surface and the back surface of a bottom of the previously captured moving cut glass sheet, where the conveyor still grasping the top of the cut glass substrate moves the cut glass substrate through the stabilizing device; wherein said stabilizing device includes a plurality of belt-driven rollers that drive both the front surface and the back surface of the previously captured cut glass substrate;
  - a laser instrument including:
    - a laser source that emits a single beam at a front surface of the stabilized moving cut glass sheet; and
    - a detector that receives a first beam reflected by the front surface of the stabilized moving cut glass sheet and receives a second beam reflected by a back surface of the stabilized moving cut glass sheet; and
  - a processor that analyzes the first beam and the second beam received by said detector to determine a distance between the first beam and the second beam where the distance is used to determine the thickness of the stabilized moving cut glass sheet.

8. The glass manufacturing system of claim 7, wherein the measured thickness of the stabilized moving cut glass sheet can be used as feedback to control the thickness of subsequent cut glass sheet that are manufactured.

9. The glass manufacturing system of claim 7, wherein said processor determines the thickness of the stabilized moving cut glass sheet by using the following equation:

$$t = d/[2\cos\theta_{incidence} \tan[\sin^{-1}((n_{air}/n_{glass})\sin\theta_{incidence})]]$$

where:
- t=thickness of the stabilized moving cut glass sheet;
- d=distance between the first beam and the second beam received by said detector;
- $n_{air}$=refraction index of air;
- $n_{glass}$=refraction index of the cut glass sheet; and
- $\theta_{incidence}$=angle of incidence that the emitted single beam interfaces with the front surface of the stabilized moving cut glass sheet.

10. The glass manufacturing system of claim 7, wherein said processor receives signals from an encoder so that a position of the moving cut glass sheet can be measured while the laser instrument initiates a thickness measurement, where the encoder is attached to one of the rollers in the plurality of belt-driven rollers.

11. The glass manufacturing system of claim 7, wherein said OLTG further comprises a pair of proximity sensors that send signals to said processor which uses said signals to determine positions on the stabilized moving cut glass sheet which correspond with where thickness measurements were made.

12. The glass manufacturing system of claim 7, wherein said OLTG further comprises a pair of proximity sensors that send signals to said processor which uses said signals to determine a velocity and a width of the moving cut glass sheet.

13. The OLTG of claim 1, wherein said glass capture device includes:
- a first sensor that detects the moving pre-cut glass substrate and causes a first pair of pneumatic cylinders to close and push in partially on the front surface and the back surface of the moving pre-cut glass substrate; and
- a second sensor that detects the moving pre-cut glass substrate and causes a second pair of pneumatic cylinders to close and push in partially on the front surface and the back surface of the moving pre-cut glass substrate.

14. The glass manufacturing system of claim 7, wherein said glass capture device includes:
- a first sensor that detects the moving cut glass substrate and causes a first pair of pneumatic cylinders to close and push in partially on the front surface and the back surface of the moving cut glass substrate; and
- a second sensor that detects the moving cut glass substrate and causes a second pair of pneumatic cylinders to close and push in partially on the front surface and the back surface of the moving cut glass substrate.

* * * * *